(12) United States Patent
Cowman-Eggert et al.

(10) Patent No.: US 11,377,575 B2
(45) Date of Patent: *Jul. 5, 2022

(54) CONFORMABLE, STRETCH RELEASEABLE ADHESIVE ARTICLES

(71) Applicant: 3M INNOVATIVE PROPERTIES COMPANY, St. Paul, MN (US)

(72) Inventors: Christina D. Cowman-Eggert, Inver Grove Heights, MN (US); Corinne E. Lipscomb, Saint Paul, MN (US); Bradley S. Forney, Cottage Grove, MN (US); Megan P. Lehmann, Stillwater, MN (US); Michael E. Fussy, Shakopee, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 915 days.

This patent is subject to a terminal disclaimer.

(21) Appl. No.: 16/074,394

(22) PCT Filed: Jan. 30, 2017

(86) PCT No.: PCT/US2017/015644
§ 371 (c)(1),
(2) Date: Jul. 31, 2018

(87) PCT Pub. No.: WO2017/136280
PCT Pub. Date: Aug. 10, 2017

(65) Prior Publication Data
US 2021/0189183 A1 Jun. 24, 2021

Related U.S. Application Data

(60) Provisional application No. 62/289,635, filed on Feb. 1, 2016, provisional application No. 62/347,265, filed on Jun. 8, 2016.

(51) Int. Cl.
*B32B 7/12* (2006.01)
*C09J 7/24* (2018.01)
(Continued)

(52) U.S. Cl.
CPC ............... *C09J 7/24* (2018.01); *B32B 7/06* (2013.01); *B32B 7/12* (2013.01); *B32B 25/08* (2013.01);
(Continued)

(58) Field of Classification Search
CPC . C09J 7/24; C09J 133/00; C09J 133/04; C09J 133/06; C09J 133/08; C09J 133/10; C09J 133/12
See application file for complete search history.

(56) References Cited

U.S. PATENT DOCUMENTS

| 4,472,480 A | 9/1984 | Olson |
| 4,736,048 A | 4/1988 | Brown |

(Continued)

FOREIGN PATENT DOCUMENTS

| EP | 2308937 | 4/2011 |
| WO | WO 2014-125961 | 8/2014 |

(Continued)

OTHER PUBLICATIONS

International Search Report for PCT International Application No. PCT/US2017/015644, dated Apr. 25, 2017, 5 pages.

*Primary Examiner* — Zachary M Davis
(74) *Attorney, Agent, or Firm* — 3M IPC

(57) ABSTRACT

The present disclosure generally relates to conformable stretch release adhesive and/or stretch-releasable, adhesive articles that are capable of attaching or adhering to a substrate and that can be removed from the substrate without causing damage to the substrate. The present disclosure also generally relates to methods of making and using such adhesive articles.

16 Claims, 1 Drawing Sheet

(51) Int. Cl.
*B32B 7/06* (2019.01)
*B32B 25/08* (2006.01)
*B32B 25/14* (2006.01)
*B32B 25/20* (2006.01)
*C09J 133/08* (2006.01)

(52) U.S. Cl.
CPC .............. *B32B 25/14* (2013.01); *B32B 25/20* (2013.01); *C09J 133/08* (2013.01); *B32B 2250/24* (2013.01); *B32B 2264/107* (2013.01); *B32B 2264/1021* (2020.08); *B32B 2307/542* (2013.01); *B32B 2307/748* (2013.01); *B32B 2405/00* (2013.01); *C09J 2301/302* (2020.08); *C09J 2301/308* (2020.08); *C09J 2301/502* (2020.08); *C09J 2433/006* (2013.01); *C09J 2453/006* (2013.01)

(56) References Cited

U.S. PATENT DOCUMENTS

| | | | |
|---|---|---|---|
| 4,980,443 A | 12/1990 | Kendziorski | |
| 5,409,189 A | 4/1995 | Luhmann | |
| 5,507,464 A | 4/1996 | Hamerski | |
| 5,719,247 A | 2/1998 | Delgado | |
| 5,897,949 A | 4/1999 | Luhmann | |
| 5,913,480 A | 6/1999 | Luhmann | |
| 5,967,474 A | 10/1999 | doCanto | |
| 5,989,708 A | 11/1999 | Kreckel | |
| 6,001,471 A * | 12/1999 | Bries ................... | C09J 7/26 |
| | | | 428/343 |
| 6,004,665 A | 12/1999 | Luhmann | |
| 6,082,686 A | 7/2000 | Schumann | |
| 6,131,864 A | 10/2000 | Schumann | |
| 6,284,360 B1 | 9/2001 | Johnson | |
| 6,403,206 B1 | 6/2002 | Bries | |
| 6,569,521 B1 | 5/2003 | Sheriden | |
| 6,572,945 B2 | 6/2003 | Bries | |
| 6,811,126 B2 | 11/2004 | Johansson | |
| 6,835,452 B1 | 12/2004 | Hamerski | |
| 6,972,141 B1 | 12/2005 | Bries | |
| 7,028,958 B2 | 4/2006 | Pitzen | |
| 7,605,212 B2 | 10/2009 | Dollase | |
| 7,781,056 B2 | 8/2010 | Bries | |
| D665,653 S | 8/2012 | Thompson | |
| 8,557,378 B2 | 10/2013 | Yamanaka | |
| 8,708,305 B2 | 4/2014 | McGreevy | |
| 8,765,881 B2 | 7/2014 | Hays | |
| 9,102,774 B2 | 8/2015 | Clapper | |
| 2004/0053044 A1 | 3/2004 | Moreno | |
| 2008/0135159 A1 | 6/2008 | Bries | |
| 2009/0229732 A1 | 9/2009 | Determan | |
| 2009/0274859 A1 | 11/2009 | Husemann | |
| 2011/0020640 A1 | 1/2011 | Sherman | |
| 2011/0179549 A1 | 7/2011 | Zaggl | |
| 2011/0250375 A1 | 10/2011 | Bries | |
| 2011/0268929 A1 | 11/2011 | Tran | |
| 2012/0156456 A1 | 6/2012 | Niimi | |
| 2014/0024756 A1 | 1/2014 | Krawinkel | |

FOREIGN PATENT DOCUMENTS

| | | |
|---|---|---|
| WO | WO 2015-195602 | 12/2015 |
| WO | WO 2017-136188 | 8/2017 |
| WO | WO 2017-136189 | 8/2017 |
| WO | WO 2017-136219 | 8/2017 |
| WO | WO 2018-039584 | 3/2018 |

* cited by examiner

CONFORMABLE, STRETCH RELEASEABLE ADHESIVE ARTICLES

CROSS REFERENCE TO RELATED APPLICATIONS

This application is a national stage filing under 35 U.S.C. 371 of PCT/US2017/015644, filed Jan. 30, 2017, which claims the benefit of provisional Application No. 62/347265, filed Jun. 8, 2016 and provisional Application No. 62/289,635, filed Feb. 1, 2016, the disclosure of which is incorporated by reference in its/their entirety herein.

TECHNICAL FIELD

The present disclosure generally relates to conformable stretch release adhesive and/or stretch-releasable, adhesive articles that are capable of attaching or adhering to a substrate and that can be removed from the substrate without causing damage to the substrate. The present disclosure also generally relates to methods of making and using such adhesive articles.

BACKGROUND

The revolutionary Command® Adhesive Strip products are a line of stretch releasable adhesive strips that hold strongly on a variety of surfaces (including paint, wood, and tile) and that remove cleanly—no holes, marks, or sticky residue. Command® Clear Hook and Strip products are clear versions of the Command® Adhesive Strip products. The Command® Clear product line seamlessly blends into the substrate on which it is mounted, allowing the user to show what matters most—their décor—not how it's hung.

In general, these products include a stretch release pressure sensitive adhesive composition disposed on tape or other carriers. These products generally have utility in bonding to various surfaces or substrates for numerous applications. Stretch-release applications are where a product is designed to firmly adhere an article, such as a hook (to hold a picture or an article of clothing) or other decorative or utilitarian element, to a surface (an adherend), yet remove cleanly when pulled away from the architectural surface at a low angle. Clean removal means that no tacky and/or unsightly residue is left behind on the surface after removal of the stretch release adhesive. During the process of stretch release removal, the adhesive layer remains adhered to the tape carrier as the carrier is stretched but releases from the surface (adherend).

SUMMARY

The inventors of the present disclosure recognized that the existing stretch releasable products could be improved or enhanced by improving conformability to the substrate or surface to which they are applied, attached, and/or mounted. In some instances, this enhanced conformability permits the stretch releasable adhesive products to hold more weight. In some embodiments, this enhanced conformability permits the stretch releasable adhesive products to be used on new surfaces (e.g., cinderblock). In some embodiments, the enhanced conformability increases or enhances the product performance on certain surfaces (e.g., rough or textured surfaces such as, for example, wallpaper, drywall, etc.). In some embodiments, the conformability is enhanced as compared to existing adhesive products.

The inventors of the present disclosure recognized that increasing the conformability of the adhesive article would provide increased or enhanced performance. The inventors of the present disclosure recognized that providing a conformable carrier was an effective method to increase conformability and stress relaxation of the adhesive article. To that end, the inventors of the present disclosure invented a multilayer carrier for use in adhesive mounting articles.

In some embodiments, a stretch releasable adhesive article comprises a multilayer carrier including a first major surface and a second major surface, the multilayer carrier including a core layer and a polymeric layer, and wherein the adhesive article and/or the core layer has a stress relaxation between about 10% and about 100% after 10 seconds as measured by texture analysis; and a stretch releasable adhesive directly adjacent to at least a portion of the first major surface of the multilayer carrier.

In some embodiments, the adhesive article and/or the core layer has a stress relaxation between about 20% and about 80% after 10 seconds as measured by texture analysis.

In some embodiments, the multilayer carrier includes at least three layers.

In some embodiments, the multilayer carrier includes a core layer and one or more polymeric film layers adjacent to the core layer.

In some embodiments, the multilayer carrier includes a core layer and one or more polymeric film layers adjacent to the core layer.

In some embodiments, the multilayer carrier includes two or more core layers.

In some embodiments, the multilayer carrier further includes two or more polymeric film layers adjacent to the core layer.

In some embodiments, the multilayer carrier includes a core layer, and the core layer is a pressure sensitive adhesive.

In some embodiments, the multilayer carrier includes a core layer, and the core layer includes at least one of polymers of one or more monomers containing one or more (meth)acryloyl groups; vinylaromatic or olefinic block copolymers; vinylaromatic or olefinic block copolymers; silicone elastomers; monomers containing one or more (meth)acryloyl groups and vinylaromatic or olefinic block copolymers; gradient or random vinylaromatic or olefinic copolymers; vinylaromatic or olefinic or (meth)acrylic polymers or copolymers with branched, graft, or comb architectures; copolymers with branched, graft, or comb architectures containing two or more of vinylaromatic or olefinic or acrylic monomers; monomers containing one or more (meth)acryloyl groups and vinylaromatic and olefinic block copolymers; (meth)acrylic block copolymers; or any combinations thereof.

In some embodiments, the core layer further includes tackifiers, plasticizers, crosslinker, pigments, fragments, rheology modifiers, and other additives.

In some embodiments, the crosslinker is at least one of acrylic monomers containing two or more (meth)acryloyl groups; (meth)acrylic monomers containing one or more aliphatically unsaturated groups; (meth)acrylic monomers containing one or more functional groups crosslinkable through post-polymerization modification; or combinations thereof.

In some embodiments, the core layer is radiation or thermally crosslinked.

In some embodiments, the polymeric film includes at least one of a vinylaromatic copolymer, a linear low density polyethylene, a low density polyethylene, a high density polyethylene, a copolymer of ethylene and (meth)acrylate monomers, a copolymer of ethylene and (meth)acrylate monomers containing acid modifications, a copolymer of ethylene and vinyl acetate, a copolymer of ethylene and vinyl acetate containing acrylate, polymers from olefin monomers with between 2 and 16 carbons, a copolymer of two or more olefin monomers, polymers from olefin monomers with atactic, syndiotactic, or isotactic stereochemistry, a copolymer of one or more olefin monomers polymerized using a metallocene catalyst, vinyl copolymers such as poly(vinyl chloride) or poly(vinyl acetate), and combinations thereof.

In some embodiments, the multilayer carrier has a thickness of at least about 0.4 mils.

In some embodiments, the multilayer carrier has a thickness of between about 0.4 mils and about 60 mils.

In some embodiments, the stretch releasable adhesive directly adjacent to at least a portion of the first major surface of the multilayer carrier is a first stretch releasable adhesive, and further comprises a second stretch releasable adhesive directly adjacent to at least a portion of the second major surface of the multilayer carrier.

In some embodiments, the second stretch releasable sensitive adhesive is the same as the first stretch releasable adhesive.

In some embodiments, the second stretch releasable adhesive is different than the first stretch releasable adhesive.

In some embodiments, the stretch releasable adhesive article comprises a liner disposed on at least a portion of the first or second stretch releasable adhesive.

In some embodiments, the stretch releasable adhesive article comprises a tab.

In some embodiments, the stretch releasable adhesive article has an area of adhesive contact with the substrate of between about 20% and about 100%.

In some embodiments, the stretch releasable adhesive article has an area of adhesive contact with the substrate of between about 40% and about 90%.

In some embodiments, the adhesive article exhibits a shear strength of greater than 1800 minutes as measured according to ASTM D3654-82.

In some embodiments, the adhesive article exhibits a shear strength of greater than 10,000 minutes as measured according to ASTM D3654-82.

In some embodiments, the adhesive article exhibits stretch debonding of between about 20 and about 170 oz/0.625 inch.

In some embodiments, the adhesive article exhibits stretch debonding of between about 45 and about 80 oz/0.625 inch.

In some embodiments, at least one of the adhesive article and/or the multilayer carrier has an elongation at break of about 50% to 1200% in at least one direction.

In some embodiments, at least one of the adhesive article and/or the multilayer carrier has a tensile strength at break sufficiently high so that the multilayer carrier will not rupture prior to being stretched and removed from an adherend at an angle of 35° or less.

In some embodiments, the stretch releasable adhesive has a glass transition temperature of about −125° C. to 15° C., as determined by dynamic mechanical analysis of the tan δ peak value.

In some embodiments, the stretch releasable adhesive has a storage modulus of about 400,000 Pa or less at 25° C., as determined by dynamic mechanical analysis.

In some embodiments, the pressure sensitive adhesive has a storage modulus of about 300,000 Pa or less at 25° C., as determined by dynamic mechanical analysis.

In some embodiments, the thickness of the stretch releasable adhesive on at least one of the first or second major surfaces of the multilayer carrier is about 1 µm to about 1 mm.

In some embodiments, the stretch releasable adhesive releases cleanly from the surface of an adherend when the stretch releasable adhesive article is stretched at an angle of about 35° or less from a surface of the adherend.

In some embodiments, the stretch releasable adhesive releases from a surface of an adherend when the multilayer carrier is stretched at an angle of about 35° or less from the adherend surface such that there are substantially no traces of the stretch releasable adhesive left behind on the surface of the adherend.

In some embodiments, after release of the adhesive article from an adherend, at least one of the adhesive article and/or the multilayer carrier has an elastic recovery of about 0% to 80%.

In some embodiments, at least one of the adhesive article or the multilayer carrier has a light transmission of at least about 50%.

In some embodiments, at least one of the adhesive article or the multilayer carrier has a light transmission of at least about 75%.

In some embodiments, at least one of the adhesive article or the multilayer carrier has a haze of no greater than 40%.

In some embodiments, at least one of the adhesive article or the multilayer carrier has a haze of no greater than 20%.

In some embodiments, the stretch releasable adhesive article has a shear strength of greater than 100,000 minutes.

In some embodiments, a method of using a stretch releasable adhesive article comprises contacting the stretch releasable adhesive article with an adherend surface.

In some embodiments, a method stretches the adhesive article from the adherend surface to remove at least a portion of the adhesive article from the adherend surface.

In some embodiments, an adhesive article is stretched at an angle of 35° or less.

In some embodiments, a method of making a stretch releasable adhesive article comprises disposing a stretch releasable adhesive directly adjacent to at least a portion of a first side of a multilayer carrier.

In some embodiments, a method includes disposing a second stretch releasable adhesive on at least a portion of a first side of a multilayer carrier wherein the stretch releasable adhesive directly adjacent to the first side of the multilayer carrier is a first stretch releasable adhesive.

In some embodiments, a method of making the stretch releasable adhesive article comprises disposing a stretch releasable adhesive directly adjacent to at least a portion of a first side of a multilayer carrier.

In some embodiments, a method comprises disposing a second stretch releasable adhesive on at least a portion of a first side of a multilayer carrier wherein the stretch releasable adhesive directly adjacent to the first side of the multilayer carrier is a first stretch releasable adhesive.

In the following detailed description, reference may be made to the above-described set of drawings in which are shown by way of illustration several exemplary embodiments. It is to be understood that other embodiments are contemplated and may be made without departing from the scope or spirit of the present disclosure.

DETAILED DESCRIPTION

Various embodiments and implementations will be described in detail. These embodiments should not be construed as limiting the scope of the present application in any manner, and changes and modifications may be made without departing from the spirit and scope of the inventions. Further, only some end uses have been discussed herein, but end uses not specifically described herein are included within the scope of the present application. As such, the scope of the present application should be determined by the claims.

The present disclosure generally relates to adhesive articles that can be stretch removed from a substrate without damage. The adhesive articles include a multilayer carrier between two stretch releasable adhesive layers. The multilayer carrier provides enhanced conformability to the adhesive article. In some instances, this enhanced conformability permits the stretch releasable adhesive products to hold more weight. In some embodiments, this enhanced conformability permits the stretch releasable adhesive products to be used on new surfaces (e.g., cinderblock). In some embodiments, the enhanced conformability increases or enhances the product performance on certain surfaces (e.g., rough or textured surfaces such as, for example, wallpaper, drywall, etc.).

Figure 1:
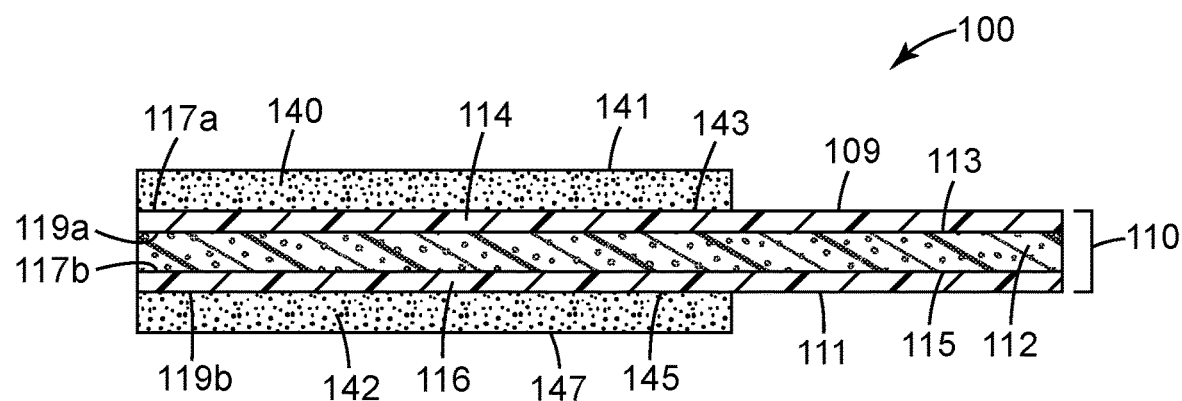
FIG. 1 is a cross-sectional side view of an exemplary embodiment of an adhesive article as generally described herein.

FIG. 1 is a cross-sectional side view of an exemplary embodiment of an adhesive article 100 as generally described herein. Adhesive article 100 includes a multilayer carrier 110 having first and second opposed major surfaces 109 and 111. In the specific embodiment of FIG. 1, multilayer carrier 110 includes a core layer 112 between two polymeric films 114 and 116. Core layer includes first and second opposed major surfaces 113 and 115. Polymeric films 114 and 116 can be the same as one another or different from one another. Polymeric films 114 and 116 can be a single layer or can be multilayer. The specific polymeric films 114 and 116 in FIG. 1 are single layers. Each of polymeric films 114 and 116 are adjacent to stretch releasable adhesive layers 140 and 142. Each of polymeric films 114 and 116 include first and second opposed major surfaces 117a, 119a and 117b, 119b, respectively. Stretch releasable adhesive layers 140 and 142 can be the same as one another or different from one another. Stretch releasable adhesive layers 140 and 142 can be a single layer or can be multilayer. Each of stretch releasable adhesive layers 140 and 142 include first and second opposed major surfaces 141, 143, 145, and 147, respectively. The specific stretch releasable adhesive layers 140 and 142 shown in FIG. 1 are single layers.

Figure 2:
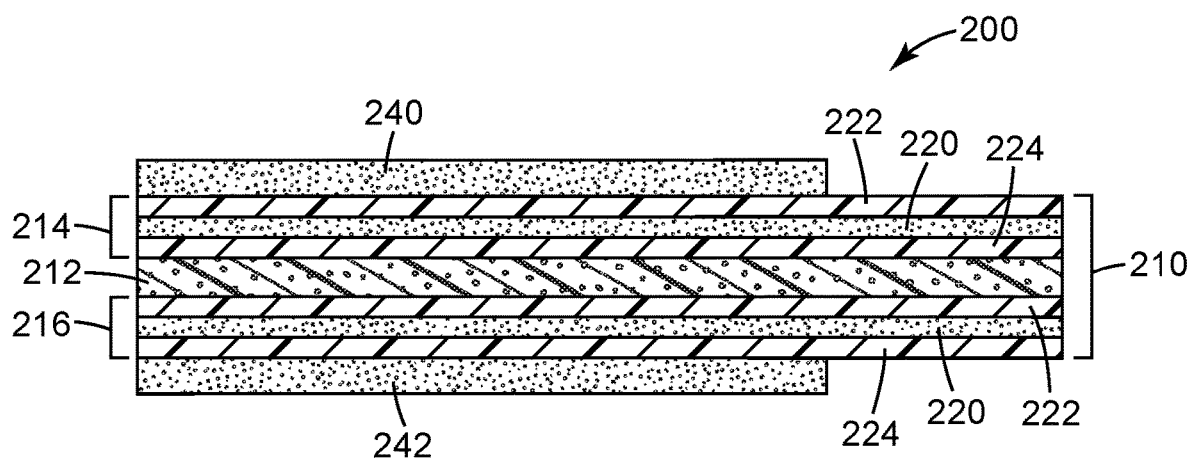
FIG. 2 is a cross-sectional side view of an exemplary embodiment of an adhesive article as generally described herein.

FIG. 2 is a cross-sectional side view of another exemplary embodiment of an adhesive article 200 as generally described herein. Adhesive article 200 is similar to adhesive article 100 shown in FIG. 1 except that the polymeric films are multilayer instead of a single layer. More specifically, adhesive article 200 includes a multilayer carrier 210. In the specific embodiment of FIG. 2, multilayer carrier 210 includes a core layer 212 between two multilayer polymeric films 214 and 216. Multilayer polymeric films 214 and 216 can be any desired multilayer polymeric film. The specific polymeric films 214 and 216 shown in FIG. 2 each include a pressure sensitive and/or stretch releasable adhesive layer 220 between two polymeric film (e.g., primer) layers 222 and 224. Polymeric films 214 and 216 can be the same as one another or different from one another. Each of the layers within polymeric films 214 and 216 can be a single layer or can be multilayer. Stretch releasable adhesive layers 240 and 242 can be the same as one another or different from one another. Stretch releasable adhesive layers 240 and 242 can be a single layer or can be multilayer. Those of skill in the art will appreciate that each of the layers described above includes first and second opposed major surfaces even though these are not specifically identified with reference numerals.

Additional information about the various layers of the adhesive articles described herein is as follows.

Carrier

The carrier of the present disclosure is a multilayer construction. In other words, the carrier has two or more layers. In some embodiments, the carrier has three layers; in some embodiments, the carrier has four layers; in some embodiments, the carrier has five layers; and in some embodiments the carrier has more than five layers.

In some embodiments, the carrier includes a core layer and at least one polymeric film layer. In some embodiments, the carrier includes two polymeric film layers on either side of the core layer. Some embodiments include more than one core layer. Some embodiments include more than two polymeric film layers.

In some embodiments, the multilayer carrier has a thickness of at least about 0.4 mils; at least 1 mil; at least 2 mils; at least 3 mils; at least 4 mils; at least 5 mils; at least 6 mils; at least 7 mils; at least 8 mils; at least 9 mils; at least 10 mils; at least 12 mils; or at least 15 mils. In some embodiments, the multilayer carrier has a thickness of less than 60 mils; of less than 59 mils; of less than 58 mils; of less than 57 mils; of less than 56 mils; of less than 55 mils; of less than 54 mils; of less than 53 mils; of less than 52 mils; of less than 51 mils; of less than 50 mils; of less than 48 mils; of less than 46 mils; of less than 44 mils; of less than 42 mils; or of less than 40 mils. In some embodiments, the multilayer carrier has a thickness of between about 0.4 mils and about 60 mils. In some embodiments, the multilayer carrier has a thickness of between about 10 mils and about 30 mils.

In some embodiments, the multilayer carrier has an elastic recovery of about 0% to 50% after release of the adhesive article from an adherend.

In some embodiments, the carrier and/or at least some of the layers of the carrier are substantially optically clear. As used herein, the term "optically clear" means having a light transmission of at least about 50% and/or a haze of no greater than 40%. Some embodiments have a light transmission of at least about 75%. Some embodiments, have a haze of no greater than 20%. Both the light transmission and the haze of the carrier (or at least some of the layers thereof) can be determined using, for example, ASTM D1003-95.

Core Layer(s)

The core layer is part of the carrier multilayer construction. The core layer can be a single layer or a multilayer construction. More than one core layer can be present in the carrier. Multiple core layers can be separated by layers of film, which may further contain one or more layers.

In some embodiments, the core layer is viscoelastic. As used herein, "viscoelastic" or "viscoelasticity" relates to the amount of force that is relaxed by the material over time. In the present application, this relaxation is measured by, for example, compression stress relaxation. Generally, in that test, a force probe is placed in the sample until it measures a specific force. The probe is then held at that depth and how the force changes with time is measured. Some embodiments relax significantly with time. In some embodiments that relate to applying an adhesive to a rough surface, viscous flow is preferred to enable good contact (i.e., the adhesive wetout test set forth in the Examples below) and also maintaining the adhesive contact over time. For example, a material that is very elastic but very soft might have initially good wetout but, over time, the material may "spring back" and lose its wetout with time, since it can't relax internal stress through viscous flow.

In some embodiments, the core layer assists the stretch releasable adhesive article in conforming to the surface of the adherend. In some embodiments, the core layer and/or adhesive article has a compression stress relaxation (CSR) between about 10% and about 100% after 10 seconds as measured by texture analysis. In some embodiments, the core layer and/or adhesive article has a compression stress relaxation (CSR) between about 10% and about 80% after 10 seconds as measured by texture analysis. In some embodiments, the stress relaxation of the core layer and/or adhesive article permits more force to be applied through the stretch release adhesive tape when a user is applying the tape to the surface of an adherend.

The core layer(s) can include any components that permit it to have the desired properties. Some exemplary desired properties include viscoelasticity, storage modulus, loss modulus, glass transition temperature, and/or good wetout. In some embodiments, the core layer has a storage modulus of between about $15 \times 10^3$ Pa and about $2.5 \times 10^6$ Pa at 25 degrees Celsius. In some embodiments, the core layer has a tan δ (where tan δ is the loss modulus divided by the storage modulus) of between about 0.4 and about 1.2 at 25 degrees Celsius. In some embodiments, the core layer has a glass transition temperature of between about −125 and about 40 degrees Celsius. The core layer has a stress relaxation between 5% and 100% after 10 s. In other embodiments, the core layer has a stress relaxation between 10% and 100% after 10 seconds.

In some embodiments, the core layer is an adhesive. In some embodiments, the core layer is a pressure sensitive adhesive. In some embodiments, the core layer fulfills the Dahlquist criterion for pressure-sensitive tack. The Dahlquist criterion for pressure-sensitive tack is defined as an adhesive formulation that possesses a modulus of not more than $3 \times 10^5$ Pa at 25° C. at 1 Hz (A. V. Pocius in "Adhesives and Adhesion Technology, $3^{rd}$ Ed." 2012, Hanser Publications, Cincinnati, Ohio; also referenced in US 2011/0179549, U.S. Pat. Nos. 7,605,212, and 5,719,247). The Dahlquist criterion for pressure sensitive tack is also described as 1 sec compliance of a typical pressure-sensitive adhesive to be $10^{-6}$ cm$^2$/dyne (D. A. Satas (ed.) in "Handbook of Pressure-Sensitive Adhesive Technology" 1982, Van Nostrand Reinhold Company Inc. New York, N.Y.)

In some embodiments, the core layer includes a (meth) acrylic polymer. The (meth)acrylic polymer comprises one or more (meth)acrylic ester monomers derived from a (e.g., non-tertiary) alcohol containing from 1 to 18 carbon atoms and preferably from 4 to 12 carbon atoms. In some embodiments, the (meth)acrylic polymer is a homopolymer. In some embodiments, the (meth)acrylic polymer is a copolymer of two or more monomers. In some embodiments, the (meth)acrylic polymer is a copolymerization of a polar (meth)acrylic monomer and an alkyl (meth)acrylic monomer. In some embodiments, the alkyl (meth)acrylic monomer has between 5 and 18 carbon atoms. The alkyl group on the (meth)acrylic monomer can be linear or branched. The glass transition of a polymer of the alkyl (meth)acrylic monomer can be between about −80 degrees Celsius and about 50 degrees Celsius. The polar (meth)acrylic monomer can be a (meth)acrylic monomer containing an acid group such as those derived from ethylenically unsaturated carboxylic acids or salts thereof and mixtures thereof. In some embodiments, the polar (meth)acrylic monomer can comprise a non-acid polar functionalized monomer including but not limited to the following: 2-hydroxyethyl (meth)acrylate; N-vinylpyrrolidone; N-vinylcaprolactam; acrylamide; mono- or di-N-alkyl substituted acrylamide; t-butyl acrylamide; dimethylaminoethyl acrylamide; N-octyl acrylamide; poly(alkoxyalkyl) (meth)acrylates including 2-(2-ethoxyethoxy)ethyl (meth)acrylate, 2-ethoxyethyl (meth) acrylate, 2-methoxyethoxyethyl (meth)acrylate, 2-methoxyethyl methacrylate, polyethylene glycol mono (meth)acrylates; alkyl vinyl ethers, including vinyl methyl ether; and mixtures thereof. In some embodiments, the polar monomers may comprise a mixture of acid functional and non-acid functional polar (meth)acrylate monomers. In some embodiments, the core layer can optionally comprise (meth)acrylic monomers copolymerized with vinyl monomers including vinyl esters (e.g., vinyl acetate and vinyl propionate), styrene, substituted styrene (e.g., α-methyl styrene), vinyl halide, and mixtures thereof. It is to be understood that in any case that the term acrylic polymer or (meth)acrylic polymer can refer to either an acrylic polymer or a methacrylic polymer.

In some embodiments, the core layer includes an acrylic that has been or can be crosslinked. The core layer may be crosslinked through the addition of crosslinkable monomers. The core layer may comprise a single crosslinking monomer, or a combination of two or more crosslinking monomers. Further, the crosslinking monomer may comprise two or more isomers of the same general structure. In some embodiments, the crosslinkable monomer may be a multifunctional (meth)acrylic monomer including but not limited to: di(meth)acrylates, tri(meth)acrylates, and tetra(meth) acrylates, such as 1,6-hexanediol di(meth)acrylate, poly (ethylene glycol) di(meth)acrylates, polybutadiene di(meth) acrylate, polyurethane di(meth)acrylates, propoxylated glycerin tri(meth)acrylate, and mixtures thereof. In other embodiments, the crosslinking monomer comprises at least two terminal groups selected from allyl, methallyl, or combinations thereof. In one embodiment, the crosslinking monomer comprises two (meth)allyl groups and a (meth) acrylate group. In some embodiments, the crosslinkable monomer is dihydrocyclopentadienyl acrylate. In some embodiments, viscoelastic core layers may be crosslinked by one or more of the same or different crosslinkable groups. In some embodiments, the viscoelastic core layer may be crosslinked using radiation or thermally-induced crosslinking techniques known in the art.

In some embodiments, the core layer is comprised of (meth)acrylic copolymers made by various polymerization techniques including but not limited to solvent polymerization, dispersion polymerization, solventless bulk polymerization, and radiation polymerization, including processes using ultraviolet light, electron beam, and gamma radiation. The monomer mixture may comprise a polymerization initiator, especially a thermal initiator or a photoinitiator of a type and in an amount effective to polymerize the comonomers.

Interfaces in the carrier may be subjected to a priming treatment prior to being positioned adjacent to one or more of: a core layer, a polymeric film layer, or a pressure-sensitive adhesive layer. The priming treatment serves to increase adhesion between two layers within the stretch release adhesive tape construction. Any suitable priming treatment known in the art can be used. The priming treatment can include, for example, a chemical adhesion promoter.

In some embodiments, the core layer contains inorganic particles. The particles may be added to the monomer mixture or added to the core layer following partial polymerization. The inorganic particles can be distributed in one or more core layers. Different inorganic particles can be distributed in different core layers. One core layer can also contain multiple compositions, types, or sizes of inorganic particles. The inorganic particles in one core layer may be of the same or different composition and surface treatment. The inorganic particles can be distributed evenly in any of the core layers or can be distributed unevenly. The surface of the inorganic particles may be treated or functionalized to be hydrophobic or to be hydrophilic. The inorganic particles may be less than 20 microns in size. In many embodiments, the inorganic particles are fumed silica particles, examples may include AEROSIL® fumed silica R972. The inorganic particles can be well dispersed in the core layers or the inorganic particles can be agglomerated or non-agglomerated and aggregated or non-aggregated. The inorganic particles can be porous or non-porous. The inorganic particles can be comprised of metals, metal oxides, ceramics, and the like. Inorganic particles can be selected from but are not limited to silica, alumina, titania, zirconia, and the like.

In some embodiments, the core layer includes copolymers containing vinylaromatic monomers. Notable embodiments include copolymers of vinylaromatic monomers, and 1,3 dienes. The resulting copolymers can be random copolymers, gradient copolymers, block copolymers, or any combinations or blends thereof. The block copolymers from the copolymerization of vinylaromatic monomers and 1,3 dienes can contain two or more blocks, an exemplary example includes Kraton™ rubbers. The block copolymers can be symmetric (e.g., A-B-A architecture) or asymmetric (e.g., A-B-C architecture). In certain embodiments, the vinylaromatic monomers include styrene. In certain embodiments, the 1,3 dienes include isoprene or butadiene. The block copolymers can be partially or fully hydrogenated. The block copolymers can be linear or have branched architectures. The gradient copolymers can be linear or have branched architectures. Materials from the copolymerization of vinylaromatic monomers and 1,3 dienes can contain tackifying resins, plasticizers, or other rheology modifiers. The vinylaromatic copolymers can be covalently crosslinked. The vinylaromatic copolymers can be branched, graft, or comb architectures containing or not containing polymer blocks. The vinylaromatic copolymers can also include the copolymerization of other monomers containing vinyl groups such as (meth)acrylate monomers containing 4 to 18 carbons, (meth)acrylic acid, and the like copolymerized into blocks, random copolymers, or gradient copolymers into linear, branched, graft, or comb architectures.

In some embodiments, the core layer contains tackifiers or rheology modifiers. The tackifying resin or rheology modifier could be any known tackifying resin or rheology modifier known in the art. In these or other embodiments, the core layer further includes plasticizers, crosslinkers, pigments, fragrances, or other additives.

Some exemplary commercially available materials that could form the core layer include, for example, 3M™ Pressure Sensitive Acrylic Plus™ Tape PT1100, and/or 3M™ VHB™ Tape 4905 pressure sensitive adhesives.

The core layer(s) described herein can be produced using any method known in the art.

Polymeric Film Layer(s)

The polymeric film layer is part of the carrier multilayer construction. The polymeric film layer can be a single layer or a multilayer construction. More than one polymeric film layer can be present in the carrier. The polymeric film layers can be comprised of any film-forming polymers.

The polymeric film layer(s) can include any components that permit it/them to have the desired properties. Some exemplary desired properties include promoting adhesion of the core layer(s) to the pressure sensitive adhesive layer(s). Other exemplary desired properties include elongation at break of greater than 50%.

In some embodiments, the polymeric film layer(s) includes at least one of a vinylaromatic copolymer, a linear low density polyethylene, a low density polyethylene, a high density polyethylene, a copolymer of ethylene and (meth) acrylate monomers, a copolymer of ethylene and (meth) acrylate monomers containing acid modifications, a copolymer of ethylene and vinyl acetate, a copolymer of ethylene and vinyl acetate containing acrylate, and/or acid modifications. In some embodiments, the film contains polymers from olefin monomers with between 2 and 16 carbons. In some embodiments, the film is a copolymer of two or more olefin monomers. In some embodiments, the film contains polymers from olefin monomers with atactic, syndiotactic, or isotactic stereochemistry. In some embodiments, the film is a copolymer of one or more olefin monomers polymerized using a metallocene catalyst. In some embodiments, the film is comprised of vinyl copolymers such as poly(vinyl chloride), poly(vinyl acetate), and the like. In some embodiments, the film is a blend comprised of any of the polymers listed above.

The polymer films described herein can be produced using any method known in the art.

Stretch Releasable Adhesive Layer(s)

The adhesives used in the adhesive articles described herein can include any adhesive having the desired properties. In some embodiments, the adhesive is stretch releasable. As used herein, the term "stretch-releasable" means removable from the surface of an adherend by stretching in the direction of the bond plane to an elongation of greater than 50%. In some embodiments, the adhesive releases cleanly from the surface of an adherend when the adhesive article is stretched at an angle of about 35° or less from a surface of the adherend. In some embodiments, the stretch releasable adhesive releases from a surface of an adherend when the multilayer carrier is stretched at an angle of about 35° or less from the adherend surface such that there are substantially no traces of the adhesive left behind on the surface of the adherend.

In some embodiments, the stretch releasable adhesive is a pressure sensitive adhesive. A general description of useful pressure sensitive adhesives may be found in the Encyclopedia of Polymer Science and Engineering, Vol. 13, Wiley-Interscience Publishers (New York, 1988). Additional description of useful pressure-sensitive adhesives may be found in the Encyclopedia of Polymer Science and Technology, Vol. 1, Interscience Publishers (New York, 1964). Any suitable composition, material or ingredient can be used in the pressure sensitive adhesive. Exemplary pressure sensitive adhesives utilize one or more thermoplastic elastomers, e.g., in combination with one or more tackifying resins.

Some exemplary stretch releasable adhesives that can be used in the adhesive articles described herein include, for example, those described in U.S. Pat. No. 6,569,521 or provisional patent application numbers (assigned to the present assignee): 62/289,585, 62/289,612, 62/439,576, or 62/289,673, each of which is incorporated herein in its entirety. In some embodiments, the adhesive layer includes one or more hydrocarbon block copolymers; and a polar phenolic tackifier comprising a phenolic moiety and having a hydroxyl value of between 20 to 130 and an acid value of less than 0.5. In some embodiments, the adhesive includes at least one of the polar phenolic tackifiers is a terpene phenol.

Some stretch releasable adhesives that can be used in the adhesive articles of the present disclosure have a glass transition temperature of about −25° C. to 15° C., as determined by dynamic mechanical analysis of the tan δ peak value. Some stretch releasable adhesives that can be used in the adhesive articles of the present disclosure have a storage modulus of about 400,000 Pa or less, or 300,000 or less at 25° C., as determined by dynamic mechanical analysis.

In some embodiments, the thickness of the stretch releasable adhesive on at least one of the first or second major surfaces of the multilayer carrier is about 1 µm to about 1 mm.

In some embodiments, the stretch releasable adhesives are tailored to achieve removal with no or minimal damage. Exemplary methods and articles for doing so are described in, for example, U.S. Pat. No. 6,835,452 and provisional patent application numbers (assigned to the present assignee): 62/289,585, 62/289,612, 62/439,576, and 62/379,812 and incorporated herein in their entirety.

Adhesive Article(s)

In some embodiments, the adhesive article further includes a tab. The tab is an area that can be easily accessed by the user to assist in or begin to stretch release the adhesive article from the adherend. The removal tab can be tacky from the outermost adhesive layer or non-tacky by being covered by layers of stretch film, non-stretch film, release liner, or from detackified adhesive.

In some embodiments, the adhesive article further includes one or more release liners. The release liner can be, for example, on either or both of the major surfaces of the stretch releasable adhesive layers. The release liner protects the adhesive during manufacturing, transit, and before use. When the user desires to use the adhesive article, the user can peel or remove the release liner to expose the adhesive. Examples of suitable liners include paper, e.g., kraft paper, or polymeric films, e.g., polyethylene, polypropylene or polyester. At least one surface of the liner can be treated with a release agent such as silicone, a fluorochemical, or other low surface energy based release material to provide a release liner. Suitable release liners and methods for treating liners are described in, e.g., U.S. Pat. Nos. 4,472,480, 4,980,443 and 4,736,048, and incorporated herein. An exemplary, suitable release liner for certain embodiments is fluoroalkyl silicone polycoated paper. The release liners can be printed with lines, brand indicia, or other information.

In some embodiments, the adhesive articles of the present disclosure can be removed from a substrate or surface without causing damage. As used herein, the term "without causing damage" or "damage-free" or the like means the adhesive article can be separated from the substrate without causing visible damage to paints, coatings, resins, coverings, or the underlying substrate and/or leaving behind residue. Visible damage to the substrates can be in the form of, for example, scratching, tearing, delaminating, breaking, crumbling, straining, and the like to any layers of the substrate. Visible damage can also be discoloration, weakening, changes in gloss, changes in haze, or other changes in appearance of the substrate.

In some embodiments, the adhesive articles of the present disclosure have increased conformability. Increased conformability can be shown, for example, by comparing the area of adhesive contact between the adhesive article and the substrate or surface to which the adhesive article is adhered. In some embodiments, the adhesive articles of the present disclosure have an area of adhesive contact with the substrate of at least about 10%; at least about 15%; at least about 20%; at least about 25%; at least about 30%; at least about 35%; at least about 40%; at least about 45%; at least about 50%; at least about 55%; at least about 60%; at least about 65%; at least about 70%; at least about 75%; or at least about 80%. In some embodiments, the adhesive articles of the present disclosure have an area of adhesive contact with the substrate of between about 15% and about 100%. In some embodiments, the adhesive articles of the present disclosure have an area of adhesive contact with the substrate of between about 20% and about 90%; and in some embodiments between about 40% and about 90%. In some embodiments, the adhesive articles of the present disclosure have an area of adhesive contact with the substrate of between about 30% and about 80%, according to the Adhesive Surface Contact Test Method.

Some adhesive articles of the present disclosure have excellent shear strength. Some embodiments of the present disclosure have a shear strength of greater than 1600 minutes as measured according to ASTM D3654-82. Some embodiments of the present disclosure have shear strength of greater than 10,000 minutes as measured according to ASTM D3654-82. Some other embodiments of the present disclosure have shear strength of greater than 100,000 minutes as measured according to ASTM D3654-82.

Some adhesive articles of the present disclosure have a lower force of stretch debonding to make the adhesive article easier to remove (e.g., a force of between about 20 to about 100 oz/0.625 inch). Some adhesive articles of the present disclosure can have a higher force of stretch debonding as to permit handling the release tab by the user without accidental separation (e.g., a force of between about 100 and about 170 oz/0.625 inch). Some embodiments of the present disclosure have stretch debonding of between about 20 and about 170 oz/0.625 inch. Some embodiments of the present disclosure have stretch debonding of between about 45 and about 80 oz/0.625 inch.

Some adhesive articles of the present disclosure have an elongation at break of greater than 50% in at least one direction. Some adhesive articles of the present disclosure have an elongation at break of between about 50% and about 1200% in at least one direction.

Some adhesive articles of the present disclosure have a tensile strength at break sufficiently high so that the adhesive article will not rupture prior to being stretched and removed from an adherend at an angle of 35° or less.

In some embodiments, the adhesive articles of the present disclosure exhibit enhanced conformability to a substrate or surface than prior art adhesive mounting articles. In some embodiments, the adhesive articles of the present disclosure hold more weight when adhered or attached to a substrate or surface than prior art adhesive mounting articles. In some embodiments, the adhesive articles of the present disclosure hold more weight for a longer period of time when adhered or attached to a substrate or surface than prior art adhesive mounting articles. In some embodiments, the adhesive articles of the present disclosure remain adhered to a textured, rough, or irregular surface for a longer period of time than prior art adhesive mounting articles. In some embodiments, the adhesive articles of the present disclosure hold a higher amount of weight when adhered to a textured, rough, or irregular surface than prior art adhesive mounting articles.

In some embodiments, the adhesive article is substantially optically clear. Some embodiments have a light transmission of at least about 50%. Some embodiments have a light transmission of at least about 75%. Some embodiments have a haze of no greater than 40%. Some embodiments, have a haze of no greater than 20%.

Mounting Device

Some embodiments further include a mounting device. Exemplary mounting devices include, for example, hooks, clips, and loops. Any of the following mounting devices can be used with the adhesive article of the present disclosure: Application Matter No. 77486US002 (assigned to the present assignee), U.S. Pat. No. 5,409,189 (Luhmann), U.S. Pat. No. 5,989,708 (Kreckel), U.S. Pat. No. 8,708,305 (McGreevy), U.S. Pat. No. 5,507,464 (Hamerski et al.), U.S. Pat. No. 5,967,474 (doCanto et al.), U.S. Pat. No. 6,082,686 (Schumann), U.S. Pat. No. 6,131,864 (Schumann), U.S. Pat. No. 6,811,126 (Johansson, et al.), U.S. Pat. No. D665,653, and U.S. Pat. No. 7,028,958 (Pitzen, et al.), all of which are incorporated by reference in their entirety herein.

In some embodiments, the adhesive article can further include a separable connector. Some exemplary separable connectors are described in, for example, U.S. Pat. Nos. 6,572,945; 7,781,056; 6,403,206; and 6,972,141, all of which are incorporated by reference in their entirety herein.

Method of Making the Adhesive Articles Described Herein

The adhesive articles described herein can be made in various ways. One embodiment involves disposing a stretch releasable adhesive onto or adjacent to a major surface of a multilayer carrier. In some embodiments, a second stretch releasable adhesive is disposed onto the other major surface of the multilayer carrier.

The stretch releasable adhesive can be disposed on the multilayer carrier in any known way, including, for example, the pressure sensitive adhesive composition can be coated onto a release liner, coated directly onto a carrier, or formed as a separate layer (e.g., coated onto a release liner) and then laminated to a carrier.

To improve adhesion of the pressure sensitive adhesive composition to the carrier, the carrier can be pretreated prior to applying, e.g., coating or laminating, the adhesive composition on the carrier. Examples of suitable treatments include corona discharge, plasma discharge, flame treatment, electron beam irradiation, ultraviolet (UV) radiation, acid etching, chemical priming and combinations thereof. The treatment can optionally be performed with a reactive chemical adhesion promoter including, e.g., hydroxyethylacrylate, or hydroxyethyl methacrylate, or another reactive species of low molecular weight.

Methods of Using the Adhesive Articles Described Herein

The stretch releasable articles of the present disclosure can be used in various ways. In some embodiments, the adhesive article is applied, attached to, or pressed into an adherend. In this way, the adhesive article contacts the adherend. Where a release liner is present, the release liner is removed before the adhesive article is applied, attached to, or pressed into an adherend. In some embodiments, at least a portion of the adherend is wiped with alcohol before the adhesive article is applied, attached to, or pressed into an adherend.

To remove the adhesive article from the adherend, at least a portion of the adhesive article is stretched away from the adherend. In some embodiments, the angle of stretch is 35° or less. In embodiments where a tab is present, the user can grip the tab and use it to stretch release the adhesive article from the adherend.

EMBODIMENTS

A. A stretch releasable adhesive article, comprising: a multilayer carrier including a first major surface and a second major surface, the multilayer carrier including a core layer and a polymeric layer, and wherein the adhesive article and/or core layer has a compression stress relaxation between about 10% and about 100% after 10 seconds as measured by texture analysis;

a stretch releasable adhesive directly adjacent to at least a portion of the first major surface of the multilayer carrier.

B. The stretch releasable adhesive article of embodiment A, wherein the adhesive article and/or the core layer has a compression stress relaxation between 20% and about 80% after 10 seconds as measured by texture analysis.

C. The stretch releasable adhesive article of any of the preceding embodiments, wherein the multilayer carrier includes at least three layers.

D. The stretch releasable adhesive article of any of the preceding embodiments, wherein the multilayer carrier includes a core layer and one or more polymeric film layers adjacent to the core layer.

E. The stretch releasable adhesive article of any of the preceding embodiments, wherein the multilayer carrier includes a core layer and one or more polymeric film layers adjacent to the core layer.

F. The stretch releasable adhesive article of any of the preceding embodiments, wherein the multilayer carrier includes two or more core layers.

G. The stretch releasable adhesive article of embodiment F, wherein the multilayer carrier further includes two or more polymeric film layers adjacent to the core layer.

H. The stretch releasable adhesive article of any of the preceding embodiments, wherein the multilayer carrier includes a core layer, and the core layer is a pressure sensitive adhesive.

I. The stretch releasable adhesive article of any of the preceding embodiments, wherein the multilayer carrier includes a core layer, and the core layer includes at least one of polymers of one or more monomers containing one or more (meth)acryloyl groups; vinylaromatic or olefinic block copolymers; vinylaromatic or olefinic block copolymers; silicone elastomers; monomers containing one or more (meth)acryloyl groups and vinylaromatic or olefinic block copolymers; gradient or random vinylaromatic or olefinic copolymers; vinylaromatic or olefinic or (meth)acrylic polymers or copolymers with branched, graft, or comb architectures; copolymers with branched, graft, or comb architectures containing two or more of vinylaromatic or olefinic or acrylic monomers; monomers containing one or more (meth)acryloyl groups and vinylaromatic and olefinic block copolymers; (meth)acrylic block copolymers; or any combinations thereof.

J. The stretch releasable adhesive article of any of embodiments D-I, wherein the core layer further includes tackifiers, plasticizers, crosslinker, or rheology modifiers.

K. The stretch releasable adhesive article of embodiment J, wherein the crosslinker is at least one of acrylic monomers containing two or more (meth)acryloyl groups; (meth) acrylic monomers containing one or more aliphatically unsaturated groups; (meth)acrylic monomers containing one or more functional groups crosslinkable through post-polymerization modification; or combinations thereof.

L. The stretch releasable adhesive article of any of embodiments D-K, wherein the core layer is radiation or thermally crosslinked.

M. The stretch releasable adhesive article of any of embodiments D-L, wherein the polymeric film includes at least one of a vinylaromatic copolymer, a linear low density polyethylene, a low density polyethylene, a high density polyethylene, a copolymer of ethylene and (meth)acrylate monomers, a copolymer of ethylene and (meth)acrylate monomers containing acid modifications, a copolymer of ethylene and vinyl acetate, a copolymer of ethylene and vinyl acetate containing acrylate, polymers from olefin monomers with between 2 and 16 carbons, a copolymer of two or more olefin monomers, polymers from olefin monomers with atactic, syndiotactic, or isotactic stereochemistry, a copolymer of one or more olefin monomers polymerized using a metallocene catalyst, vinyl copolymers such as poly(vinyl chloride) or poly(vinyl acetate), and combinations thereof.

N. The stretch releasable adhesive article of any of the preceding embodiments, wherein the multilayer carrier has a thickness of at least about 0.4 mils.

O. The stretch releasable adhesive article of any of the preceding embodiments, wherein the multilayer carrier has a thickness of between about 0.4 mils and about 60 mils.

P. The stretch releasable adhesive article of any of the preceding embodiments, wherein the stretch releasable adhesive directly adjacent to at least a portion of the first major surface of the multilayer carrier is a first stretch releasable adhesive, and further comprising: a second stretch releasable adhesive directly adjacent to at least a portion of the second major surface of the multilayer carrier.

Q. The stretch releasable adhesive article of embodiment P, wherein the second stretch releasable sensitive adhesive is the same as the first stretch releasable adhesive.

R. The stretch releasable adhesive article of embodiment P, wherein the second stretch releasable adhesive is different than the first stretch releasable adhesive.

S. The stretch releasable adhesive article of any of embodiments P-R, further comprising a liner disposed on at least a portion of the first or second stretch releasable adhesive.

T. The stretch releasable adhesive article of any of the preceding embodiments, further comprising a tab.

U. The stretch releasable adhesive article of any of the preceding embodiments, wherein the stretch releasable adhesive article has an area of adhesive contact with the substrate of between about 20% and about 100%.

V. The stretch releasable adhesive article of any of the preceding embodiments, wherein the stretch releasable adhesive article has an area of adhesive contact with the substrate of between about 40% and about 90%.

W. The stretch releasable adhesive article of any of the preceding embodiments, wherein the adhesive article exhibits a shear strength of greater than 1800 minutes as measured according to ASTM D3654-82.

X. The stretch releasable adhesive article of any of the preceding embodiments, wherein the adhesive article exhibits a shear strength of greater than 10,000 minutes as measured according to ASTM D3654-82.

Y. The stretch releasable adhesive article of any of the preceding embodiments, wherein the adhesive article exhibits stretch debonding of between about 20 and about 170 oz/0.625 inch.

Z. The stretch releasable adhesive article of any of the preceding embodiments, wherein the adhesive article exhibits stretch debonding of between about 45 and about 80 oz/0.625 inch.

AA. The stretch releasable adhesive article of any of the preceding embodiments, wherein at least one of the adhesive article and/or the multilayer carrier has an elongation at break of about 50% to 1200% in at least one direction.

BB. The stretch releasable adhesive article of any of the preceding embodiments, wherein at least one of the adhesive article and/or the multilayer carrier has a tensile strength at break sufficiently high so that the multilayer carrier will not rupture prior to being stretched and removed from an adherend at an angle of 35° or less.

CC. The stretch releasable adhesive article of any of the preceding embodiments, wherein the stretch releasable adhesive has a glass transition temperature of about −125° C. to 15° C., as determined by dynamic mechanical analysis of the tan δ peak value.

DD. The stretch releasable adhesive article of any of the preceding embodiments, wherein the stretch releasable adhesive has a storage modulus of about 400,000 Pa or less at 25° C., as determined by dynamic mechanical analysis.

EE. The stretch releasable adhesive article of any of the preceding embodiments, wherein the pressure sensitive adhesive has a storage modulus of about 300,000 Pa or less at 25° C., as determined by dynamic mechanical analysis.

FF. The stretch releasable adhesive article of any of the preceding embodiments, wherein the thickness of the stretch releasable adhesive on at least one of the first or second major surfaces of the multilayer carrier is about 1 µm to about 1 mm.

GG. The stretch releasable adhesive article of any of the preceding embodiments, wherein the stretch releasable adhesive releases cleanly from the surface of an adherend when the stretch releasable adhesive article is stretched at an angle of about 35° or less from a surface of the adherend.

HH. The stretch releasable adhesive article of any of the preceding embodiments, wherein the stretch releasable adhesive releases from a surface of an adherend when the multilayer carrier is stretched at an angle of about 35° or less from the adherend surface such that there are substantially no traces of the stretch releasable adhesive left behind on the surface of the adherend.

II. The stretch releasable adhesive article of any of the preceding embodiments, wherein after release of the adhesive article from an adherend, wherein at least one of the adhesive article and/or the multilayer carrier has an elastic recovery of about 0% to 80%.

JJ. The stretch releasable adhesive article of any of the preceding embodiments, wherein at least one of the adhesive article or the multilayer carrier has a light transmission of at least about 50%.

KK. The stretch releasable adhesive article of any of the preceding embodiments, wherein at least one of the adhesive article or the multilayer carrier has a light transmission of at least about 75%.

LL. The stretch releasable adhesive article of any of the preceding embodiments, wherein at least one of the adhesive article or the multilayer carrier has a haze of no greater than 40%.

MM. The stretch releasable adhesive article of any of the preceding embodiments, wherein at least one of the adhesive article or the multilayer carrier has a haze of no greater than 20%.

NN. The stretch releasable adhesive article of any of the preceding embodiments, having a shear strength of greater than 100,000 minutes.

OO. A method of using a stretch releasable adhesive article, comprising: contacting the stretch releasable adhesive article of any of embodiments A-NN with an adherend surface.

PP. The method of embodiment OO, further comprising stretching the adhesive article from the adherend surface to remove at least a portion of the adhesive article from the adherend surface.

QQ. The method of embodiment PP, where the adhesive article is stretched at an angle of 35° or less.

RR. A method of making a stretch releasable adhesive article comprising: disposing a stretch releasable adhesive directly adjacent to at least a portion of a first side of a multilayer carrier.

SS. The method of embodiment RR, further comprising: disposing a second stretch releasable adhesive on at least a portion of a first side of a multilayer carrier; wherein the stretch releasable adhesive directly adjacent to the first side of the multilayer carrier is a first stretch releasable adhesive.

TT. A method of making the stretch releasable adhesive article of any of embodiments A-NN, comprising: disposing a stretch releasable adhesive directly adjacent to at least a portion of a first side of a multilayer carrier.

UU. The method of embodiment TT, further comprising: disposing a second stretch releasable adhesive on at least a portion of a first side of a multilayer carrier; wherein the stretch releasable adhesive directly adjacent to the first side of the multilayer carrier is a first stretch releasable adhesive.

The following examples describe some exemplary constructions of various embodiments of the adhesive articles and methods of making the adhesive articles described in the present application. The following examples describe some exemplary constructions and methods of constructing various embodiments within the scope of the present application. The following examples are intended to be illustrative, but are not intended to limit the scope of the present application.

EXAMPLES

Materials used in the various Examples below are shown in Table 1. Other test materials and general procedures are listed below.

TABLE 1

Material and supplier information

| Material | Supplier |
| --- | --- |
| Iso-octyl acrylate (IOA) | Available under the trade designation SR 440 from Sartomer, USA, LLC. |
| 2-Ethyl hexyl acrylate (EHA) | BASF Corporation, Florham Park, NJ |
| C12 Acrylate Monomer (C12) | Prepared as describe in Example 9 of U.S. Pat. No. 9,102,774 |
| Acrylic acid (AA) | BASF Corporation, Florham Park, NJ |
| IRGACURE 651, a photoinitiator | BASF Corporation, Florham Park, NJ |
| Dihydrocyclopentadienyl acrylate, a crosslinker (DCPA) | BASF Corporation, Florham Park, NJ |
| 3M Acrylic Plus Tape PT1100, Black, 1.14 mm | 3M Company, St. Paul, MN |
| 3M VHB ™ Tape 4905 | 3M Company, St. Paul, MN |
| D1163 PT, a linear triblock copolymer based on styrene and isoprene, with a polystyrene content of 15% (SIS) | Kraton Performance Polymers Inc., Houston, TX |
| WINGTACK PLUS, an aromatically modified C-5 hydrocarbon tackifier resin | Total Cray Valley, Exton, PA |
| EXACT 8201, an ethylene octene plastomer | ExxonMobil Corporation, Houston, TX |
| OPTEMA TC 120, an ethylene methyl acrylate (EMA) copolymer | ExxonMobil Corporation, Houston, TX |
| 3M Adhesion Promoter 4298UV, primer | 3M Company, St. Paul, MN |
| AEROSIL R972 fumed silica | Evonik Industries, Hanau-Wolfgang, Germany |
| HDK H15 fumed silica | Wacker Chemical Corporation Adrian, MI |

Painted Drywall Panel Preparation

Drywall panels (obtained from Materials Company, Metzger Building, St. Paul, Minn.) were painted with Sherwin Williams DURATION Home Interior paint in Ben Bone color (obtained from the Sherwin-Williams Company of Cleveland, Ohio) or BEHR PREMIUM PLUS ULTRA Primer and Paint 2 in 1 Flat Egyptian Nile (obtained from Behr Process Corporation of Santa Ana, Calif.).

Procedure for painting drywall with paints: a first coat of paint was applied to a drywall panel by paint roller, followed by air drying for 24 hours at ambient conditions. A second coat of paint was applied dried at ambient conditions for 24 hours. The panel was placed in a forced air oven set to 50° C. for 7 days. The panel was then stored at ambient conditions until use.

Test Methods

Static Shear Test Method

Static shear was determined according to the method of ASTM D3654-82 entitled, "Holding Power of Pressure-Sensitive Tapes," with the following modifications. The release liner(s), where present, was removed from the test sample. Test samples having the dimensions 0.5 in×0.5 in (1.27 cm×1.27 cm) were adhered to the test substrate through the adhesive composition at 72° F. (22° C.) and 50% relative humidity by passing a 15 lb. (6.8 kg) hand held roller over the length of the sample two times at a rate of 12 in/min (30.48 cm/min). A metal vapor coated polyester film having the dimensions 0.75 in×4 in (1.91 cm×10.16 cm) was bonded to one side of the adhesive test sample for the purpose of attaching the load.

The test sample was allowed to dwell on the test substrate for 1 hour at 22° C. and 50% relative humidity; thereafter a 1 kg weight was applied to the metal vapor coated polyester film. The time to failure was recorded in minutes and the average value, calculated pursuant to procedures A and C of section 10.1 of the standard, for all of the test samples was reported. Three samples were tested and the average time to failure of the three samples and the failure mode each sample was recorded. A value was reported with a greater than symbol (i.e., >) when at least one of the three samples had not failed at the time the test was terminated.

Stretch Debond Force Test Method

A conventional variable angle peel jig was modified to be used with a Thwing-Albert friction/peel tester (Model 225-1, Thwing-Albert Instrument Co., Philadelphia, Pa.) to measure low angle debond forces for adhesive tape adhered to a test surface. The jig could securely hold a 2 in×12 in (5.08 cm×30.5 cm) substrate. The jig was secured to the platen. A 0.625 in×2.75 in (1.59 cm×6.99 cm) test sample was adhered to the substrate of interest to provide a bond area of 0.625 in×2 in (1.59 cm×5.08 cm). The test sample had a 0.625 in×0.75 in (1.59 cm×1.91 cm) non-adhering tab for clamping to the Thwing-Albert tester. A 1.59 cm×5.08 cm×0.16 cm high impact polystyrene flat piece was bonded to the side of a test sample opposite the substrate. The test sample was then conditioned for 1 hour under conditions of 50% relative humidity and 22° C. and was then debonded at a peel speed of 30 in/min (76.2 cm/min) and at a peel angle of 3°. The average debond force required to stretch the backing for removal from the substrate was recorded in units of oz per 0.625 in width. Three measurements were made from each substrate and the results were averaged.

% Elongation at Break Test Method

Stretch release adhesive tape test strips were prepared so that the dimensions were 0.625 in (1.59 cm) in width and 3 in (7.62 cm) in length. Both ends of the test strips were clamped in a load cell of an INSTRON tensile tester (Model 5944, Instron-Illinois Tool Works, Inc., Norwood, Mass.) using a samples gauge length of 2.5 cm. The sample was pulled at a crosshead speed of 30 in/min (76.2 cm/min) until the strip was broken. The % elongation was reported.

% Adhesive Surface Contact Test Method

The first release liner from the stretch release adhesive tape test strip was removed and was applied to a rigid stainless steel backing using finger pressure. The second release liner was then removed. A thin layer of STAZON Multi-Surface Ink in Jet Black (Tsukineko Co., Japan), was applied evenly to the stretch release adhesive strip using a hard rubber brayer. Before the ink dried, the inked surface of the stretch release adhesive tape was pressed onto the smooth side of a Cracked Ice White Acrylic Lighting Panel (Plaskolite Inc., Columbus, Ohio). The inked stretch release adhesive strip was held on the surface using finger pressure for five seconds. The inked adhesive strip was then gently peeled from the surface. The transferred ink was allowed to dry for one hour. Areas darkened due to ink transfer were considered areas with adhesive contact to the surface. A digital camera was used to take photographs of the inked test surface. Imaging software was used to determine the percent area with adhesive contact.

Compression Stress Relaxation (CSR) Test Method

Compression stress relaxation (CSR) was measured using a Model TA.XTplus texture analyzer with a TA-8¼" ball probe (Stable Micro Systems, Ltd., Godalming, U.K.). One release liner was removed from the test sample and the adhesive strip was placed adhesive side down onto a glass microscope slide and the sample was rolled down with a 150 gram roller using two passes. Alternatively, the core layer could be assessed alone, in which case no release liner would be removed. The glass microscope slide was clamped into the sample fixture and the sample height was calibrated for each sample prior to taking the stress relaxation measurements. The second release liner was removed from each test sample prior to taking the stress relaxation measurements. The CSR for each sample was measured with the texture analyzer in compression mode with a pre-test speed of 10 mm/second and a test speed of 0.05 mm/second. The sample was compressed with the probe until a target force of 50 grams was achieved. The probe was held in position for a duration of 10.1 seconds and the force on the probe was measured with time. The CSR was calculated after 10 seconds of hold time. The CSR for each samples was expressed as the % of stress relaxed after the 10 second holding duration.

Examples 1-6

Preparation of Acrylic Core Layer

The acrylic core layer of Example 1 was made by charging a quart jar (about 500 mL) with 90 parts IOA, 10 parts AA, 2.0 phr of DCPA crosslinker, and 0.2 phr of IRGACURE 651. As used herein, the abbreviation "phr" refers to parts per 100 parts resin. The monomer mixture was purged with nitrogen for 5 minutes and then exposed to low intensity ultraviolet radiation until a coatable prepolymer syrup was obtained. Subsequently, an additional 0.75 phr of IRGACURE 651 was added and the formulation was mixed thoroughly by rolling over night. The formulation was then coated between release liners and cured by 1500 mJ/cm$^2$ of UVA light for 2.5 minutes.

The acrylic core layer of Examples 2 and Examples 4-6 were prepared as described for Example 1 using the materials and amounts, and having the core thicknesses as shown in Table 2. Example 3 was also prepared as described for Example 1 using the materials, amounts, and having the core thicknesses shown in Table 2. Example 3 also included 10 phr of fumed silica mixed with the syrup before coating.

TABLE 2

Acrylic core formulations for Examples 1-6

| Example | Core Layer | DCPA (phr) | Fumed Silica (phr) | Core Thickness (mil) |
|---|---|---|---|---|
| 1 | IOA/AA (90:10) | 2.0 | 0 | 30 |
| 2 | C12/AA (88:12) | 4.0 | 0 | 25 |
| 3 | 2EHA/AA (90:10) | 3.0 | 10.0 | 25 |
| 4 | 2EHA/AA (82:18) | 3.0 | 0 | 8 |

TABLE 2-continued

Acrylic core formulations for Examples 1-6

| Example | Core Layer | DCPA (phr) | Fumed Silica (phr) | Core Thickness (mil) |
|---|---|---|---|---|
| 5 | 2EHA/AA (82:18) | 3.0 | 0 | 42 |
| 6 | 2EHA/AA (82:18) | 3.0 | 0 | 25 |

Preparation of Stretch Release Adhesive Tapes

A three layer multilayer film was prepared having 0.5 mil thick outer skin layers of OPTEMA TC 120 and a 0.8 mil thick core layer of EXACT 8201. The multilayer film was prepared using a blown film extrusion process as is known in the art. Both sides of the multilayer film were treated with 4298UV primer. The films were allowed to dry at ambient temperature for 5 minutes to allow for the removal of any solvent.

For each of the Examples 1-6, the release liner was removed from the acrylic core layer, and with the multilayer film stretched taut, of the acrylic core layer was laminated to one side of the film. The acrylic core layer was applied to the multilayer film so that the final stretch release adhesive test strips were cut in the cross-direction of the multilayer film relative to the direction of film extrusion. The multilayer film lamination process was repeated for the other side of the core acrylic core layer.

A stretch release adhesive coated liner was then laminated to both sides of the multilayer film/acrylic core construction using two passes through a laboratory laminator operating at 12 inches per minute and 20 psi nip pressure. The stretch release adhesive coating thickness was 16.5 grains/24 in$^2$ (2.75 mil). A section on the outside was left adhesive-free to function as a pull tab. The stretch release adhesive used for Examples 1-5 was similar to the adhesive composition E27 described in PCT Publication No. WO2015/195602. The stretch release adhesive used for Example 6 was a polydisiloxane polyoxamide block copolymer based adhesive. The polydisiloxane polyoxamide elastomer used was like that of Example 12 of U.S. Pat. No. 8,765,881. For the adhesive, MQ resin SR545 (GE Silicones, Waterford, N.Y.) was added at 100 parts based on the polydisiloxane polyoxamide elastomer. Strips for testing were die cut from the laminated construction.

Example 7

The stretch release adhesive tape strip of Example 7 was the same construction as that described for Examples 1-5 except instead of an acrylic core, the core layer was based on a linear SIS block copolymer material. The Example 7 core layer was prepared according to the following procedure: 100 g of D1163 PT, 100 g of WINGTACK Plus, and 200 g of toluene were combined in a glass jar. The jar was sealed and rolled until the D1163 PT and WINGTACK Plus were dissolved. The polymer solution was then poured into an aluminum pan lined with a Teflon sheet. The pan was placed into an oven at 120° C. overnight to remove the toluene. The remaining mixture of D1163 PT and WINGTACK Plus was pressed into a 15 mil thickness between release liners using a Carver Model 4389 Press at 120° C.

Example 8

The stretch release adhesive tape strip of Example 8 was the same construction as that described for Examples 1-5 except instead of an acrylic core layer, the core layer was a silicone polyurea block copolymer based pressure-sensitive adhesive (SPU) like that of Example 28 in U.S. Pat. No. 6,569,521. The core thickness was 13 mil.

Example 9

The stretch release adhesive tape strip of Example 9 was the same construction as that described for Examples 1-6 except that the core layer was 3M Acrylic Plus Tape PT1100. The core thickness was 43 mil.

Comparative Example C1

Comparative Example C1 was a commercially available product, TESA POWERSTRIPS, Product No. 58010-00044, Tesa SE, Hamburg, Germany.

Comparative Example C2

Comparative Example C2 was a commercially available product, TESA POWERSTRIPS Transparent, Product No. 58812-00000, Tesa SE, Hamburg, Germany.

Comparative Example C3

Comparative Example C2 was an adhesive strip provided with a commercially available product, PERMA Clear Removable Hooks, Product No. 826, Perma Products, Brookvale, NSW, Australia.

The Static Shear and Stretch Debond Force properties of the stretch release adhesive tape constructions of Examples 1-9 and Comparative Examples C1-C3 are shown in Table 3.

TABLE 3

Static Shear and Stretch Debond Force

| Example | Shear - Glass (min)$^a$ | Shear - Glass St. Dev. (min) | Shear - Drywall (min)$^b$ | Shear - Drywall St. Dev. (min) | Stretch Debond (oz per 0.625 in)$^c$ | Stretch Debond St. Dev. (oz per 0.625 in)$^c$ |
|---|---|---|---|---|---|---|
| 1 | 4549 | 1751 | 12225 | 1808 | 50.60 | 1.92 |
| 2 | 40926 | 13724 | 39907 | 18570 | 167.80 | 4.03 |
| 3 | >100000 | 0 | >100000 | 51247 | 63.26 | 0.83 |
| 4 | 35521 | 11237 | 59433 | 22789 | 45.29 | 0.39 |
| 5 | 3644 | 1125 | 342 | 135 | 63.05 | 7.43 |
| 6 | 18034 | 16551 | 19837 | 7023 | 50.41 | 0.80 |
| 7 | 1 | 0 | 1 | 1 | 66.73 | 1.64 |

TABLE 3-continued

Static Shear and Stretch Debond Force

| Example | Shear - Glass (min)[a] | Shear - Glass St. Dev. (min) | Shear - Drywall (min)[b] | Shear - Drywall St. Dev. (min) | Stretch Debond (oz per 0.625 in)[c] | Stretch Debond St. Dev. (oz per 0.625 in)[c] |
|---|---|---|---|---|---|---|
| 8 | >100000 | 0 | >100000 | 0 | 48.43 | 0.98 |
| 9 | 2307 | 407 | 2351 | 820 | 75.89 | 3.71 |
| C1 | >100000 | 0 | >79888 | 68229 | 54.00 | 4.58 |
| C2 | 63684 | 5327 | 29850 | 9284 | 43.44 | 1.32 |
| C3 | 9448 | 1678 | 1279 | 1891 | 134.76 | 4.29 |

[a]Shear tests were performed on glass substrate.
[b]Shear tests were performed on painted drywall with BEHR PREMIUM PLUS ULTRA ® Primer and Paint 2 in 1 Flat Egyptian Nile.
[c]Stretch Debond tests were performed on painted drywall with Sherwin Williams Duration Home Interior paint in Ben Bone color The % Adhesive Surface Contact and Elongation at Break properties of the stretch release adhesive tape constructions of Examples 1-9 and Comparative Examples C1-C3 are shown in Table 4.

TABLE 4

% Adhesive Surface Contact and Elongation at Break

| Example | Adhesive Surface Contact (%) | Adhesive Surface Contact St. Dev. (%) | Elongation at Break (%) | Elongation at Break St. Dev. (%) |
|---|---|---|---|---|
| 1 | 87.5 | 0.5 | 740.7 | 23.0 |
| 2 | 30.7 | 5.6 | 550.3 | 27.2 |
| 3 | 76.9 | 5.5 | 769.0 | 10.6 |
| 4 | 44.6 | 1.5 | 795.7 | 43.5 |
| 5 | 70.2 | 7.2 | 740.3 | 12.7 |
| 6 | 77.2 | 6.1 | 901.3 | 17.5 |
| 7 | 75.1 | 7.3 | 552.3 | 8.1 |
| 8 | 40.9 | 1.7 | 790.7 | 22.4 |
| 9 | 84.0 | 9.1 | 542.3 | 17.5 |
| C1 | 62.9 | 11.6 | 1074.0 | 9.9 |
| C2 | 64.5 | 8.7 | 1198.0 | 31.1 |
| C3 | 23.6 | 3.6 | 677.5 | 36.1 |

The compression stress relaxation properties of the stretch release adhesive tape constructions of Examples 1-9 and Comparative Examples C1-C3 are shown in Table 5.

TABLE 5

% Compression Stress Relaxation

| Example | CSR after 10 seconds (%) | CSR after 10 seconds St. Dev. (%) |
|---|---|---|
| 1 | 47.1 | 0.4 |
| 2 | 78.2 | 0.5 |
| 3 | 50.9 | 0.6 |
| 4 | 50.9 | 0.2 |
| 5 | 52.4 | 0.2 |
| 6 | 56.5 | 0.9 |
| 7 | 65.0 | 2.4 |
| 8 | 33.0 | 0.5 |
| 9 | 32.0 | 0.7 |
| C1 | 25.8 | 0.1 |
| C2 | 23.5 | 0.3 |
| C3 | 19.2 | 0.4 |

Reference throughout this specification to "one embodiment," "some embodiments," "one or more embodiments" or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in certain embodiments," "in one embodiment" or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

The recitation of all numerical ranges by endpoint is meant to include all numbers subsumed within the range (i.e., the range 1 to 10 includes, for example, 1, 1.5, 3.33, and 10).

The terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

All references mentioned herein are hereby incorporated by reference in their entirety.

With reference to the Figures, like numerals are used to designate like components throughout the set of Figures.

Those having skill in the art will appreciate that many changes may be made to the details of the above-described embodiments and implementations without departing from the underlying principles thereof. Further, various modifications and alterations of the present invention will become apparent to those skilled in the art without departing from the spirit and scope of the invention. The scope of the present application should, therefore, be determined only by the following claims and equivalents thereof.

What is claimed is:

1. A stretch releasable adhesive article, comprising:
a multilayer carrier including a first major surface and a second major surface, the multilayer carrier including two or more polymeric film layers and a core layer comprising a pressure sensitive adhesive disposed between at least two of the two or more polymeric film layers, and wherein the adhesive article has a compression stress relaxation between about 30% and about 100% after 10 seconds as measured by texture analysis; and
a stretch releasable adhesive directly adjacent to at least a portion of the first major surface of the multilayer carrier,
wherein the pressure sensitive adhesive includes a (meth)acrylic polymer.

2. The stretch releasable adhesive article of claim 1, wherein the adhesive article exhibits a shear strength of greater than 10,000 minutes as measured according to ASTM D3654-82.

3. The stretch releasable adhesive article of claim 1, wherein the pressure sensitive adhesive includes a crosslinked or crosslinkable (meth)acrylic polymer.

4. The stretch releasable adhesive article of claim 1, wherein the core layer further includes tackifiers, plasticizers, crosslinker, or rheology modifiers.

5. The stretch releasable adhesive article of claim 1, wherein the polymeric film includes at least one of a vinylaromatic copolymer, a linear low density polyethylene, a low density polyethylene, a high density polyethylene, a copolymer of ethylene and (meth)acrylate monomers, a copolymer of ethylene and (meth)acrylate monomers containing acid modifications, a copolymer of ethylene and vinyl acetate, a copolymer of ethylene and vinyl acetate containing acrylate, polymers from olefin monomers with between 2 and 16 carbons, a copolymer of two or more olefin monomers, polymers from olefin monomers with atactic, syndiotactic, or isotactic stereochemistry, a copolymer of one or more olefin monomers polymerized using a metallocene catalyst, vinyl copolymers, and combinations thereof.

6. The stretch releasable adhesive article of claim 1, wherein the multilayer carrier has a thickness of between about 0.4 mils and about 60 mils.

7. The stretch releasable adhesive article of claim 1, wherein the stretch releasable adhesive directly adjacent to at least a portion of the first major surface of the multilayer carrier is a first stretch releasable adhesive, and further comprising:
a second stretch releasable adhesive directly adjacent to at least a portion of the second major surface of the multilayer carrier.

8. The stretch releasable adhesive article of claim 1, wherein the stretch releasable adhesive article has an area of adhesive contact with the substrate of between about 15% and about 100%.

9. The stretch releasable adhesive article of claim 1, wherein the adhesive article exhibits stretch debonding of between about 20 and about 170 oz/0.625 inch.

10. The stretch releasable adhesive article of claim 1, wherein at least one of the adhesive article and/or the multilayer carrier has a tensile strength at break sufficiently high so that the multilayer carrier will not rupture prior to being stretched and removed from an adherend at an angle of 35° or less.

11. The stretch releasable adhesive article of claim 1, wherein the stretch releasable adhesive has a glass transition temperature of about −125° C. to 15° C., as determined by dynamic mechanical analysis of the tan δ peak value.

12. The stretch releasable adhesive article of claim 1, wherein the stretch releasable adhesive has a storage modulus of about 400,000 Pa or less at 25° C., as determined by dynamic mechanical analysis.

13. The stretch releasable adhesive article of claim 1, wherein at least one of the adhesive article or the multilayer carrier has a light transmission of at least about 75% and a haze of no greater than 40%.

14. The stretch releasable adhesive article of claim 1, having a shear strength of greater than 100,000 minutes as measured according to ASTM D3654-82.

15. The stretch releasable adhesive article of claim 1, wherein the stretch releasable adhesive article has an area of adhesive contact with the substrate of between about 40% and about 90%.

16. A method of using a stretch releasable adhesive article, comprising:
contacting the stretch releasable adhesive article of claim 1 with an adherend surface.

* * * * *